United States Patent
Otsuka

(10) Patent No.: US 8,929,639 B2
(45) Date of Patent: Jan. 6, 2015

(54) IMAGE PROCESSING APPARATUS, IMAGE PROCESSING METHOD, IMAGE PROCESSING PROGRAM, AND VIRTUAL MICROSCOPE SYSTEM

(75) Inventor: Takeshi Otsuka, Tokyo (JP)

(73) Assignee: Olympus Corporation, Tokyo (JP)

(*) Notice: Subject to any disclaimer, the term of this patent is extended or adjusted under 35 U.S.C. 154(b) by 254 days.

(21) Appl. No.: 13/429,831

(22) Filed: Mar. 26, 2012

(65) Prior Publication Data
US 2012/0250960 A1 Oct. 4, 2012

(30) Foreign Application Priority Data
Mar. 29, 2011 (JP) ................. 2011-072437

(51) Int. Cl.
*G06K 9/00* (2006.01)
*G02B 21/36* (2006.01)
(52) U.S. Cl.
CPC ............ *G02B 21/365* (2013.01); *G06K 9/0014* (2013.01)
USPC ............................ 382/133; 382/128; 382/134
(58) Field of Classification Search
CPC ................... G06K 9/0014; G06K 9/00127
See application file for complete search history.

(56) References Cited

U.S. PATENT DOCUMENTS

| | | | |
|---|---|---|---|
| 2010/0189321 A1* | 7/2010 | Otsuka | 382/128 |
| 2010/0201800 A1* | 8/2010 | Yamamoto et al. | 348/79 |
| 2011/0057946 A1* | 3/2011 | Yamamoto | 345/589 |
| 2013/0096707 A1* | 4/2013 | Nuyan et al. | 700/97 |

FOREIGN PATENT DOCUMENTS

| | | |
|---|---|---|
| JP | 2008-215820 A | 9/2008 |
| JP | 2011-053074 A | 3/2011 |

OTHER PUBLICATIONS

Miyazawa, Tomokatsu et al., "Fiber region detection using absorbance spectrum shift from HE stain specimen", Proceedings of Optics & Photonics (Japan, Nov. 2008), pp. 354-355.
Japanese Official Action dated Oct. 14, 2014 received from related application JP 2011-072437 together with an English language translation.

* cited by examiner

*Primary Examiner* — Anand Bhatnagar
*Assistant Examiner* — Soo Park
(74) *Attorney, Agent, or Firm* — Scully, Scott, Murphy & Presser, P.C.

(57) ABSTRACT

Provided is an image processing apparatus capable of analyzing a target sample image with high accuracy in line with a phenomenon occurring in the target sample. The image processing device includes: a dye spectrum storage portion (233) for storing a dye spectrum of a dye used in staining the stained sample; and an arithmetic portion (250) including: a variation characteristic calculating portion (2501) for calculating, based on the stored dye spectrum, a variation characteristic representing either a sharp or gradual change of the dye spectrum in the wavelength direction; and a dye-amount/variation-amount estimating portion (2503) for estimating, based on the stored dye spectrum and the calculated variation characteristic, a variation amount from a pixel value of each pixel forming the stained sample image based on the dye-amount and the variation characteristic, the arithmetic portion analyzing the stained sample image at least based on the variation amount.

11 Claims, 17 Drawing Sheets

WAVELENGTH

WAVELENGTH

IMAGE PROCESSING APPARATUS, IMAGE PROCESSING METHOD, IMAGE PROCESSING PROGRAM, AND VIRTUAL MICROSCOPE SYSTEM

CROSS REFERENCE

The present application claims the priority of Japanese Patent Application No. 2011-072437 filed on Mar. 29, 2011, the content of which is incorporated herein by reference.

TECHNICAL FIELD

The present invention relates to an image processing apparatus, an image processing method, an image processing program, and a virtual microscope system.

RELATED ART

One of the physical quantities expressing a physical property specific to a subject of imaging is a spectral transmittance spectrum. Spectral transmittance is a physical quantity expressing a ratio of transmitted light to incident light at each wavelength, and is specific information of an object with a value that does not change regardless of an extrinsic influence, unlike color information such as an RGB value that varies depending on changes in illumination light. Therefore, the spectral transmittance is used in various fields, as information for reproducing the color of a subject itself. For example, for a body tissue sample, particularly in the field of pathological diagnosis using pathological specimens, spectral transmittance has been used as an example of a spectral characteristic value for analysis of images acquired through imaging of specimens. Examples of application of the spectral transmittance in pathological diagnosis are described in further detail below.

In one of pathological examinations in pathological diagnosis, a sample of tissue are collected from part of a lesion and observed under a microscope, to thereby diagnose disease or to determine the degree of expansion of the lesion. This has been known as tissue diagnosis. In the tissue diagnosis, which is also referred to as biopsy, it is widely practiced to observe, by using a microscope, an enlarged view of a thin slice of several micron thickness of a block specimen obtained from a removed organ or a pathological specimen obtained from a needle aspiration biopsy, for the purpose of obtaining various findings. In particular, transmission observation using an optical microscope is one of the observation methods most widely practiced, because materials for optical microscopes are relatively inexpensive and easy to handle and this method has been traditionally used for many years. In the case of transmission observation, a sliced specimen hardly absorbs or scatters light and is substantially transparent and colorless, and hence it is common to stain the specimen with a dye prior to observation.

Various methods have been proposed as the staining method, and there have been no less than a hundred methods in total. Particularly for pathological specimens, hematoxylin-eosin stain (hereinafter, referred to as "H&E stain") using bluish purple hematoxylin and red eosin has been generally used.

Hematoxylin is a natural substance extracted from plants, and has no stainability itself. However, hematin, which is an oxide of hematoxylin, is a basophilic dye and combines with a substance negatively charged. Because deoxyribonucleic acid (DNA) included in a cell nucleus is negatively charged due to a phosphate group included therein as a structural element, the DNA combines with hematin to be stained bluish purple. As described above, substance having stainability is not hematoxylin but its oxide, namely hematin. However, because it is common to use hematoxylin as the name of dye, this applies to the following explanations.

Meanwhile, eosin is an acidophilic dye, and combines with a substance positively charged. Amino acid and protein may be charged positively or negatively depending on its pH environment, and have a strong tendency to be charged positively under acidity. For this reason, acetic acid may be added to eosin. The protein included in a cytoplasm combines with eosin to be stained red or light red.

In a sample subjected to H&E stain (stained sample), cell nuclei, bone tissues or the like are stained bluish purple, while cytoplasm, connective tissues, red corpuscles or the like are stained red, to have them become easily visible. Accordingly, an observer can ascertain the size, positional relation or the like of elements structuring cell nuclei or the like, thereby enabling morphological determination of the sample condition.

Observation of a stained sample is performed by multiband imaging the sample so as to display the sample image on a display screen of an external device, in addition to visual inspection by an observer. In a case of displaying a sample image on a display screen, the image is subjected to processing for estimating spectral transmittance at each point on the sample from the obtained multiband image, and processing for estimating, based on the estimated spectral transmittance, a dye amount with which the sample is stained, to thereby synthesize a display image as an RGB image for displaying the sample.

Examples of a method of estimating the spectral transmittance at each point on a sample from a multiband image of the sample include an estimation method by principal component analysis and an estimation method by the Wiener estimation. The Wiener estimation is widely known as a technique of linear filtering methods for estimating an original signal from an observed signal on which noise is superimposed, which is a method for minimizing an error, by taking into consideration statistical properties of an observed object and properties of imaging noise (observation noise). Because signals from a camera include some noise, the Wiener estimation is highly useful as a method of estimating an original signal.

A method of synthesizing a display image from a multiband image of a sample is explained below.

First, a sample is subjected to multiband imaging. For example, 16 pieces of bandpass filters are switched by rotating a filter wheel, to thereby obtain a multiband image a frame sequential method. In this way, multiband images having a pixel value of 16 bands at each point on the sample can be obtained. Although the dye is essentially distributed three-dimensionally in a sample to be observed, the dye cannot be directly captured as a three-dimensional image by an ordinary transmission observation system, and is observed as a two-dimensional image in which illumination light that has passed the sample is projected onto an imaging element of the camera. Accordingly, each point mentioned herein signifies a point on the sample corresponding to each pixel projected onto the imaging element.

For an arbitrary point (pixel) x of the captured multiband image, a relation expressed by the following Equation (1) based on a response system of the camera is established between a pixel value $g(x,b)$ in a band b and spectral transmittance $t(x,\lambda)$ of a corresponding point on the sample.

$$g(x,b)=\int_\lambda f(b,\lambda)s(\lambda)e(\lambda)t(x,\lambda)d\lambda+n(b) \quad (1)$$

In Equation (1), $\lambda$ denotes a wavelength, $f(b,\lambda)$ denotes a spectral-transmittance of a b-th filter, $s(\lambda)$ denotes a spectral sensitivity characteristic of the camera, $e(\lambda)$ denotes a spectral emission characteristic of illumination, and $n(b)$ denotes imaging noise in the band b. b denotes a serial number for identifying the band, and is an integer satisfying $1 \leq b \leq 16$ herein. In actual calculation, the following Equation (2) obtained by discretizing Equation (1) in a wavelength direction is used.

$$G(x) = FSET(x) + N \quad (2)$$

In Equation (2), when the number of samples in the wavelength direction is designated as D, and the number of bands is designated as B (here, B=16), G(x) corresponds to a matrix of B rows by one column corresponding to a pixel value $g(x,b)$ at a point x. Similarly, T(x) denotes a matrix of D rows by one column corresponding to $t(x,\lambda)$, and F denotes a matrix of B rows by D columns corresponding to $f(b,\lambda)$. On the other hand, S denotes a diagonal matrix of D rows by D columns, and a diagonal element corresponds to $s(\lambda)$. Similarly, E denotes a diagonal matrix of D rows by D columns, and a diagonal element corresponds to $e(\lambda)$. N denotes a matrix of B rows by one column corresponding to $n(b)$. In Equation (2), because Equations of a plurality of bands are put together using a matrix, a variable b expressing the band is not explicitly described. Further, an integral of the wavelength $\lambda$ is replaced by a product of matrices.

To simplify description, a matrix H defined by the following Equation (3) is introduced. The matrix H is also called as a system matrix.

$$H = FSE \quad (3)$$

Thus, Equation (2) is replaced by the following Equation (4)

$$G(x) = HT(x) + N \quad (4)$$

The spectral transmittance at each point on the sample is then estimated from the captured multiband image by using the Wiener estimation. An estimate value (spectral transmittance data) $\hat{T}(x)$ of the spectral transmittance can be calculated by the following Equation (5). $\hat{T}$ means that T has a symbol "^ (hat)" affixed thereon, the symbol "^" representing an estimate value.

$$\hat{T}(x) = WG(x) \quad (5)$$

Here, W is expressed by the following Equation (6), and is referred to as "Wiener estimation matrix" or "estimation operator used in the Wiener estimation".

$$W = R_{SS} H^t (H R_{SS} H^t + R_{NN})^{-1} \quad (6)$$

where $()^t$: transposed matrix, $()^{-1}$: inverse matrix.

In Equation (6), $R_{SS}$ is a matrix of D rows by D columns and represents an autocorrelation matrix of the spectral transmittance of the sample. $R_{NN}$ is a matrix of B rows by B columns and represents an autocorrelation matrix of noise of the camera used for imaging.

After thus estimating spectral transmittance data $\hat{T}(x)$, amounts of dyes at a corresponding point on the sample (sample point) are estimated based on the $\hat{T}(x)$. The dyes to be estimated are three kinds of dyes, which are hematoxylin, eosin that stains a cell cytoplasm, and eosin that stains red blood cells or an original dye of the red blood cells that are not stained. These three kinds of dyes are abbreviated as dye H, dye E, and dye R, respectively. To be strict, the red blood cells have an intrinsic color itself even in an unstained state, and after the H&E stain is performed, the color of the red blood cells and the color of eosin that has changed in a staining process are superposed on each other at the time of observation. Therefore, to be precise, color obtained by combining the both is referred to as dye R.

Generally, in a substance that transmits light, it is known that the Lambert-Beer law represented by the following Equation (7) is established between an intensity $I_0(\lambda)$ of incident light and an intensity $I(\lambda)$ of emitted light at each wavelength $\lambda$.

$$\frac{I(\lambda)}{I_0(\lambda)} = e^{-k(\lambda) \cdot d} \quad (7)$$

In Equation (7), $k(\lambda)$ denotes a value specific to a substance determined depending on the wavelength, and d denotes a thickness of the substance.

The left side of Equation (7) indicates a spectral transmittance $t(\lambda)$, and hence Equation (7) can be replaced by the following Equation (8).

$$t(\lambda) = e^{-k(\lambda) \cdot d} \quad (8)$$

Further, a spectral absorbance $a(\lambda)$ is represented by the following Equation (9).

$$a(\lambda) = k(\lambda) \cdot d \quad (9)$$

Thus, Equation (8) can be replaced by the following Equation (10).

$$t(\lambda) = e^{-a(\lambda)} \quad (10)$$

When an H&E stained sample is stained with three kinds of dyes including the dye H, the dye E, and the dye R, the following Equation (11) is established at each wavelength $\lambda$ by the Lambert-Beer law.

$$\frac{I(\lambda)}{I_0(\lambda)} = e^{-(k_H(\lambda) \cdot d_H + k_E(\lambda) \cdot d_E + k_R(\lambda) \cdot d_R)} \quad (11)$$

In Equation (11), $k_H(\lambda)$, $k_E(\lambda)$, and $k_R(\lambda)$ denote $k(\lambda)$ corresponding to the dye H, the dye E, and the dye R, respectively, and for example, are dye spectra of respective dyes that stain the sample. Further, $d_H$, $d_E$, and $d_R$ each indicate a virtual thickness of the dye H, the dye E, and the dye R, respectively, at each point on the sample corresponding to each image position of the multiband image. Basically, dyes are dispersed in a sample, and thus the concept of thickness may not be accurate. However, the thickness may serve as an index of a relative dye amount indicating how much amount of dye is present, as compared to a case where the sample is assumed to be stained with a single dye. That is, it can be said that $d_H$, $d_E$, and $d_R$ indicate a dye amount of the dye H, the dye E, and the dye R, respectively. The values $k_H(\lambda)$, $k_E(\lambda)$, and $k_R(\lambda)$ can be easily acquired from the Lambert-Beer law, by preparing beforehand samples that are stained individually by using the dye H, the dye E, and the dye R, and measuring a spectral transmittance thereof with a spectrometer.

When it is assumed that a spectral transmittance at a position x is $t(x,\lambda)$ and a spectral absorbance at the position x is $a(x,\lambda)$, Equation (9) can be replaced by the following Equation (12).

$$a(x,\lambda) = k_H(\lambda) \cdot d_H + k_E(\lambda) \cdot d_E + k_R(\lambda) \cdot d_R \quad (12)$$

When it is assumed that an estimated spectral transmittance at the wavelength $\lambda$ of the spectral transmittance $\hat{T}(x)$ estimated by using Equation (5) is $\hat{t}(x,\lambda)$, and an estimated absorbance is $\hat{a}(x,\lambda)$, Equation (12) can be replaced by the following Equation (13). Here, means that t has a symbol "~" affixed thereon, and a^ means that a has a symbol "^" affixed thereon.

$$\hat{a}(x,\lambda) = k_H(\lambda) \cdot d_H + k_E(\lambda) \cdot d_E + k_R(\lambda) \cdot d_R \quad (13)$$

In Equation (13), unknown variables are three variables of $d_H$, $d_E$, and $d_R$. Therefore, when simultaneous Equations are acquired from Equation (13) for at least three different wavelengths $\lambda$, these values can be obtained. To further improve the accuracy, simultaneous Equations can be acquired from Equation (13) for four or more different wavelengths $\lambda$, so as to perform multiple regression analysis. For example, simultaneous Equations acquired from Equation (13) for three wavelengths $\lambda_1$, $\lambda_2$, and $\lambda_3$ can be expressed in a matrix as the following Equation (14).

$$\begin{pmatrix} \hat{a}(x, \lambda_1) \\ \hat{a}(x, \lambda_2) \\ \hat{a}(x, \lambda_3) \end{pmatrix} = \begin{pmatrix} k_H(\lambda_1) & k_E(\lambda_1) & k_R(\lambda_1) \\ k_H(\lambda_2) & k_E(\lambda_2) & k_R(\lambda_2) \\ k_H(\lambda_3) & k_E(\lambda_3) & k_R(\lambda_3) \end{pmatrix} \begin{pmatrix} d_H \\ d_E \\ d_R \end{pmatrix} \quad (14)$$

Equation (14) is replaced here by the following Equation (15).

$$\hat{A}(x) = Kd(x) \quad (15)$$

In Equation (15), when the number of samples in a wavelength direction is D, A^(x) is a matrix of D rows and one column corresponding to a^(x,λ), K is a matrix of D rows and three columns corresponding to k(λ), and d(x) is a matrix of three rows and one column corresponding to $d_H$, $d_E$, and $d_R$ at a point x. Here, A^ means that A has a symbol "^" affixed thereon.

According to Equation (15), the dye amounts $d_H$, $d_E$, and $d_R$ are calculated using a least square method. The least square method is a method of determining d(x) such that a square sum of an error is minimized in a single regression Equation, and the dye amounts can be calculated by the following Equation (16). In Equation (16), d^(x) is an estimated dye amount.

$$\hat{d}(x) = (K^T K)^{-1} K^T \hat{A}(x) \quad (16)$$

Further, when the estimated dye amounts $\hat{d}_H$, $\hat{d}_E$, $\hat{d}_R$ obtained by Equation (16) are substituted in Equation (12), a restored spectral absorbance a(x,y) can be obtained according to the following Equation (17). Here, ã means that a has a symbol " (tilde)" affixed thereon.

$$\tilde{a}(x,\lambda) = k_H(\lambda) \cdot \hat{d}_H + k_E(\lambda) \cdot \hat{d}_E \cdot k_R(\lambda) \cdot \hat{d}_R + e(\lambda) \quad (17)$$

An estimated error e(λ) in dye amount estimation is obtained based on the estimated spectral absorbance a^(x,λ) and the restored spectral absorbance a(x,y) according to the following Equation (18). Hereinafter, e(λ) is referred to as "residual spectrum".

$$e(\lambda) = \hat{a}(x,\lambda) - \tilde{a}(x,\lambda) \quad (18)$$

The estimated spectral absorbance a^(x,λ) can be represented by the following Equation (19) based on Equations (17) and (18).

$$\hat{a}(x,\lambda) = k_H(\lambda) \cdot \hat{d}_H + k_E(\lambda) \cdot \hat{d}_E k_R(\lambda) \cdot \hat{d}_R + e(\lambda) \quad (19)$$

The Lambert-Beer law formulates attenuation of light transmitting through a semi-transparent substance while assuming that there is no refraction or scattering. However, in an actual sample, refraction and scattering can both occur. Therefore, when attenuation of light due to the sample is modeled only by the Lambert-Beer law, errors may occur along with the modeling.

However, it is quite difficult to construct a model including refraction or scattering in biological specimens, which is impracticable in actual application. Therefore, the residual spectrum e(λ), which is a modeling error including influences of refraction and scattering, is taken into consideration, so that unnatural color variation by a physical model can be prevented from being caused.

Further, there has been experimentally confirmed a phenomenon that the dye spectrum in E stain shifts to a higher wavelength or a lower wavelength depending on the difference in tissues, and there has been proposed a method of calculating the shift amount (see, for example, "Fiber region detection using absorbance spectrum shift from HE stain specimen", Tomokatsu Miyazawa et al., Proceedings of Optics & Photonics Japan 2008, P 354-355, November 2008, which is hereinafter referred to as Non-patent Document 1). According to the method disclosed in Non-patent Document 1, the shift of E stain is subjected to first approximation in estimating the dye amount, to thereby calculate the shift amount. Then, based on the shift amount thus calculated, cytoplasm and fibers are distinguished from each other.

SUMMARY OF THE INVENTION

Problems to be Solved by the Invention

However, there has also been experimentally confirmed another phenomenon that the dye spectrum changes either sharply or gradually in the wavelength direction, in addition to the phenomenon of shifting to a higher wavelength or a lower wavelength. FIGS. 15A and 15B each schematically show a dye spectrum shifting and a dye spectrum changing either sharply or gradually in the wavelength direction, respectively, in which the wavelength is on the abscissa while the absorbance is on the ordinate. As illustrated in the drawings, as a dye spectrum changes either sharply or gradually in the wavelength direction, an estimate value of the dye amount is also changed, resulting in degradation in sample analysis accuracy.

FIGS. 16A and 16B are graphs each showing an example of the absorbance spectrum of a muscle fiber and of a collagen fiber in an H&E stained sample, respectively, in which the wavelength is on the abscissa while the absorbance is on the ordinate. In FIGS. 16A and 16B, the solid line represents a measured value while the dashed line represents an estimate value of the absorbance spectrum obtained through a conventional method of estimating a dye amount based on the Lambert-Beer law.

As is apparent from FIGS. 16A and 16B, the absorbance spectrum has an estimate value larger than the measured value in the case of a muscle fiber while having an estimate value smaller than the measured value in the case of a collagen fiber, in a wavelength range of 510 nm to 550 nm which is a peak wavelength of E stain. FIGS. 17A and 17B are graphs each showing a residual spectrum between the actual measured value and the estimate value of each of the absorbance spectra in the cases of the muscle fiber and of the collagen fiber of FIGS. 16A and 16B, respectively. The residual spectra shown in the drawings indicate that some factors may cause the dye spectrum to change either sharply or gradually in the wavelength direction due to the difference in tissue.

For the above-mentioned reasons, when the shift amount of a dye spectrum is calculated and then cytoplasm and fibers are distinguished from each other based on the shift amount thus calculated, as disclosed in Non-patent Document described above, accuracy in the distinction, that is, the sample analysis accuracy may be deteriorated. As a result, even in a virtual microscope system for acquiring a virtual slide image of a stained sample, the sample analysis accuracy is similarly deteriorated.

Therefore, the present invention has been made in view of the above-mentioned problems, and it is an object of the present invention to provide an image processing apparatus, an image processing method, an image processing program, and a virtual microscope system, which are capable of analyzing, with high accuracy, an image of a target sample in line with a phenomenon occurring in the target sample.

Means for Solving the Problem

In order to attain the above-mentioned object, according to a first aspect of the present invention, there is provided an image processing apparatus for processing a stained sample image obtained by imaging a stained sample, which includes:

a dye spectrum storage portion for storing a dye spectrum of a dye used in staining the stained sample; and an arithmetic portion including a variation characteristic calculating portion and a dye-amount/variation-amount estimating portion, the variation characteristic calculating portion calculating a variation characteristic based on the dye spectrum stored in the dye spectrum storage portion, a variation characteristic representing either a sharp or gradual change of the dye spectrum in the wavelength direction, the dye-amount/variation-amount estimating portion estimating, based on the dye spectrum stored in the dye spectrum storage portion and the variation characteristic calculated by the variation characteristic calculating portion, a dye-amount and a variation amount based on the variation characteristic from a pixel value of each pixel forming the stained sample image, the arithmetic portion analyzing the stained sample image at least based on the variation amount.

Further, in order to attain the above-mentioned object, according to a second aspect of the present invention, there is provided an image processing method of processing a stained sample image obtained by imaging a stained sample, the method including the steps of:

acquiring a dye spectrum of a dye used in staining the stained sample;

calculating, based on the dye spectrum thus acquired, a variation characteristic at least representing either a sharp or gradual change of the dye spectrum in the wavelength direction;

estimating, based on the dye spectrum and the variation characteristic, a dye-amount and a variation amount based on the variation characteristic from a pixel value of each pixel forming the stained sample image; and analyzing the stained sample image at least based on the variation amount.

Further, in order to attain the above-mentioned object, according to a third aspect of the present invention, there is provided a computer-readable storage medium having an image processing program, for processing a stained sample image obtained by imaging a stained sample, recorded thereon, the program causing a computer to execute the processes of:

acquiring a dye spectrum of a dye used in staining the stained sample;

calculating, based on the dye spectrum thus acquired, a variation characteristic at least representing either a sharp or gradual change of the dye spectrum in the wavelength direction;

estimating, based on the dye spectrum and the variation characteristic, a dye-amount and a variation amount based on the variation characteristic from a pixel value of each pixel forming the stained sample image; and analyzing the stained sample image at least based on the variation amount.

Further, in order to attain the above-mentioned object, according to an fourth aspect of the present invention, there is provided a virtual microscope system for acquiring a virtual slide image of a stained sample, the virtual microscope system including:

an image acquiring portion for acquiring a stained sample image by imaging the stained sample using a microscope;

a dye spectrum storage portion for storing a dye spectrum of a dye used in staining the stained sample; and an arithmetic portion including a variation characteristic calculating portion and a dye-amount/variation-amount estimating portion, the variation characteristic calculating portion calculating a variation characteristic based on the dye spectrum stored in the dye spectrum storage portion, a variation characteristic representing either a sharp or gradual change of the dye spectrum in the wavelength direction, the dye-amount/variation-amount estimating portion estimating, based on the dye spectrum stored in the dye spectrum storage portion and the variation characteristic calculated by the variation characteristic calculating portion, a dye-amount and a variation amount based on the variation characteristic from a pixel value of each pixel forming the stained sample image, the arithmetic portion analyzing the stained sample image at least based on the variation amount, the virtual microscope system being configured to acquire a virtual slide image of the stained sample, based on the stained sample analyzed by the arithmetic portion.

Effect of the Invention

According to the present invention, an image of a target sample can be analyzed with high accuracy, in line with a phenomenon occurring in the target sample.

DETAILED DESCRIPTION OF THE INVENTION

Figure 1:
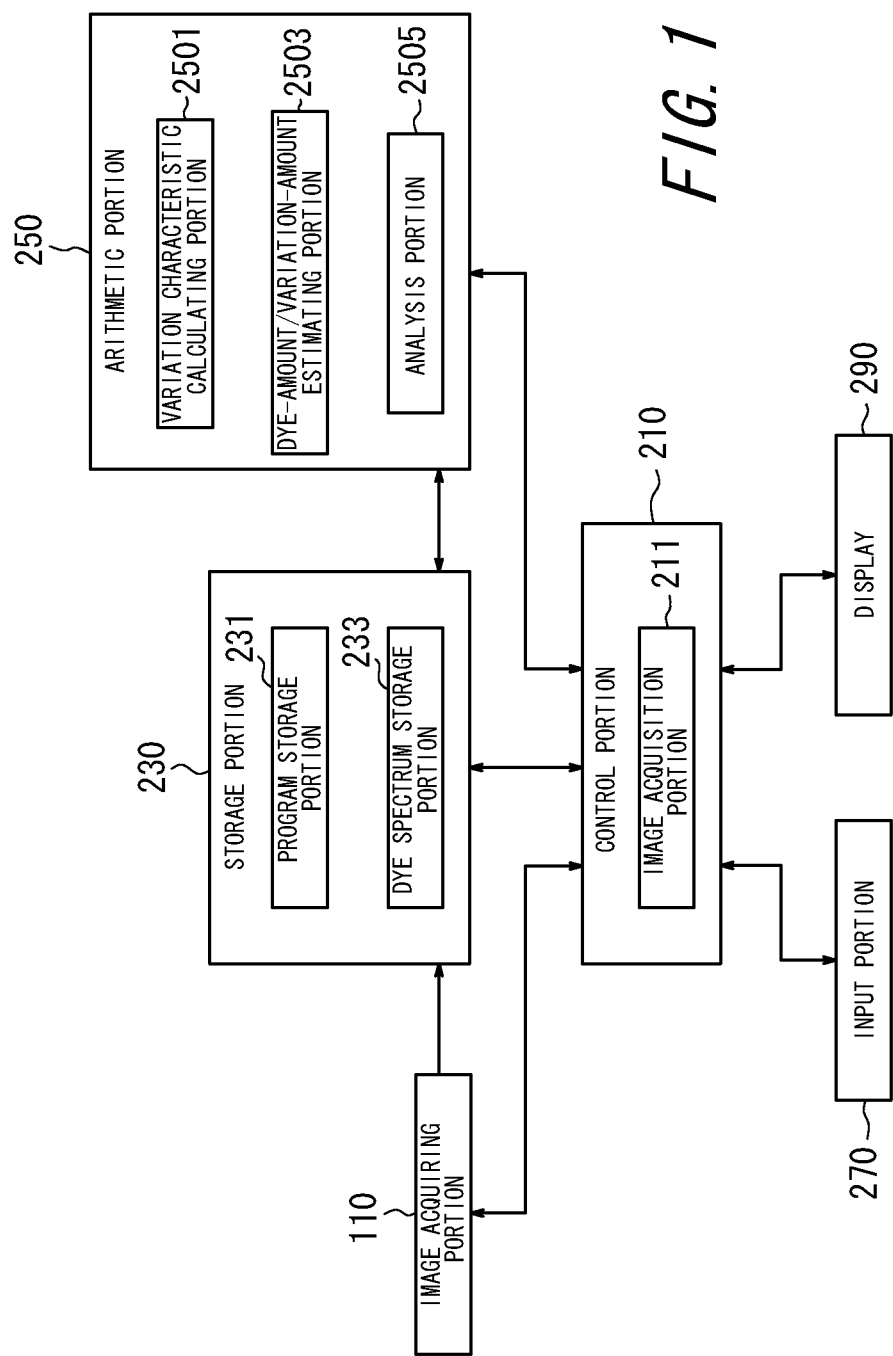
FIG. 1 is a block diagram illustrating a functional configuration of a main part of an image processing apparatus according to a first embodiment of the present invention.

In the following, preferred embodiments of the present invention are described in detail with reference to the drawings. However, the present invention is not limited to the embodiments described below. Further, in the drawings, like parts are denoted by like reference numerals or symbols.

First Embodiment

FIG. 1 is a block diagram illustrating a functional configuration of a main part of an image processing apparatus according to a first embodiment of the present invention. The image processing apparatus includes a microscope and a computer such as a personal computer, and includes an image acquiring portion 110, an input portion 270, a display 290, an arithmetic portion 250, a storage portion 230, and a control portion 210 that controls respective portions.

The image acquiring portion 110 is configured by employing, for example, a multi-spectral camera including a liquid crystal tunable filter or an acoustic tunable filter, and images a target sample (stained sample) by a multi-spectral camera, to thereby acquire a multi-spectral image of the target sample.

The input portion 270 is implemented by, for example, an input device such as a keyboard, a mouse, a touch panel, and various switches, and outputs, to the control portion 210, an input signal corresponding to an operational input.

The display 290 is implemented by a display device such as a liquid crystal display (LCD), an electro luminescence (EL) display, or a cathode ray tube (CRT) display, and displays various screens based on display signals input from the control portion 210.

The arithmetic portion 250 comprises a variation characteristic calculating portion 2501, a dye-amount/variation-amount estimating portion 2503, and an analysis portion 2505. The arithmetic portion 250 is implemented by hardware such as a CPU.

The storage portion 230 includes a program storage portion 231 for storing an image processing program for operating the image processing apparatus, and a dye spectrum storage portion 233 for storing dye spectra $k_H(\lambda)$, $k_E(\lambda)$, and $k_R(\lambda)$ of respective dyes that employed in a staining method used for staining the target sample. The storage portion 230 stores data to be used during execution of the image processing program and the like. As described above, the dye spectra $k_H(\lambda)$, $k_E(\lambda)$, and $k_R(\lambda)$ of respective dyes stored in the dye spectrum storage portion 233 are calculated, for example, by the Lambert-Beer law, based on the spectral transmittance measured from samples each individually stained by using a dye H, a dye E, and a dye R. The storage portion 230 is implemented by various IC memories such as a ROM and a RAM formed of a rewritable flash memory, a hard disk incorporated therein or connected by a data communication terminal, a combination of an information storage medium such as a CD-ROM and a reader thereof and the like.

The control portion 210, which includes an image acquisition control portion 211 for controls the operation of the image acquiring portion 110 so as to acquire an image of a target sample, provides instruction and transfers data to the respective components constituting the image processing apparatus, based on an input signal input from the input portion 270, an image input from the image acquiring portion 110, and programs and data stored in the storage portion 230, to thereby perform overall control of the entire operation. The control portion 210 is implemented by hardware such as CPU.

In the following, an operation of the image processing apparatus according to this embodiment is described.

Figure 2:
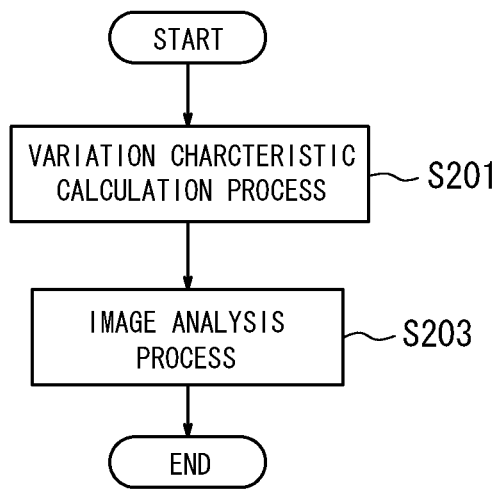
FIG. 2 is a flowchart schematically illustrating an operation of the image processing apparatus of FIG. 1.

FIG. 2 is a flowchart schematically illustrating an operation of the image processing apparatus according to this embodiment. The image processing apparatus according to this embodiment first carries out a variation characteristic calculation process, so as to calculate a variation characteristic representing either a sharp or gradual change of the dye spectrum in the wavelength direction (Step S201), and then carries out an image analysis process, so as to analyze a target sample image (stained sample image) based on the variation characteristic calculated in the variation characteristic calculation process (Step S203).

In the variation characteristic calculation process, the control portion 210 reads out a dye spectrum $k_E(\lambda)$ of E stain stored in the dye spectrum storage portion 233, and subjects the dye spectrum $k_E(\lambda)$ thus read out to second-order differentiation in the variation characteristic calculating portion 2501 of the arithmetic portion 250, using, for example, a Laplacian filter, to thereby calculate variation characteristic $k_E''(\lambda)$. In other words, the variation characteristic $k_E''(\lambda)$ is obtained as a second-order derivative spectrum calculated by subjecting the dye spectrum $k_E(\lambda)$ to second-order differentiation. Here, in order to obtain variation characteristics of other dyes, the spectrums of the dyes each may also be subjected to second-order differentiation in the variation characteristic calculating portion 2501. Further, the dye spectrum $k_E(\lambda)$ may be simultaneously subjected to first-order differentiation to calculate $k_E'(\lambda)$, for example, so that a plurality of variation characteristics representing different variations may also be calculated. The calculation results obtained in the variation characteristic calculation process are stored in the storage portion 230.

Figure 3:
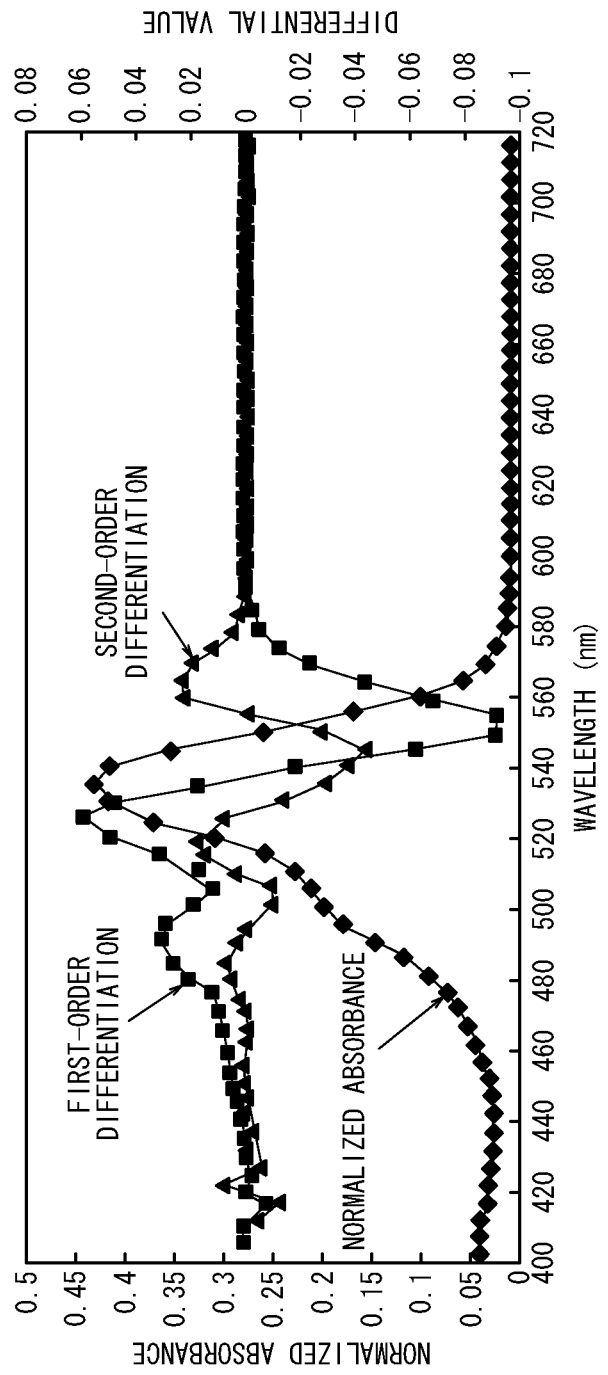
FIG. 3 is a graph showing a relation between normalized absorbance characteristics in the dye spectrum of E stain stored in the dye spectrum storage portion of FIG. 1 and variation characteristics of a first-order derivative spectrum and a second-order derivative spectrum.

FIG. 3 is a graph showing a relation between normalized absorbance characteristics in the dye spectrum of E stain stored in the dye spectrum storage portion 233 and variation characteristics of the first-order derivative spectrum and the second-order derivative spectrum calculated for the dye spectrum by the variation characteristic calculating portion 2501.

Figure 4:
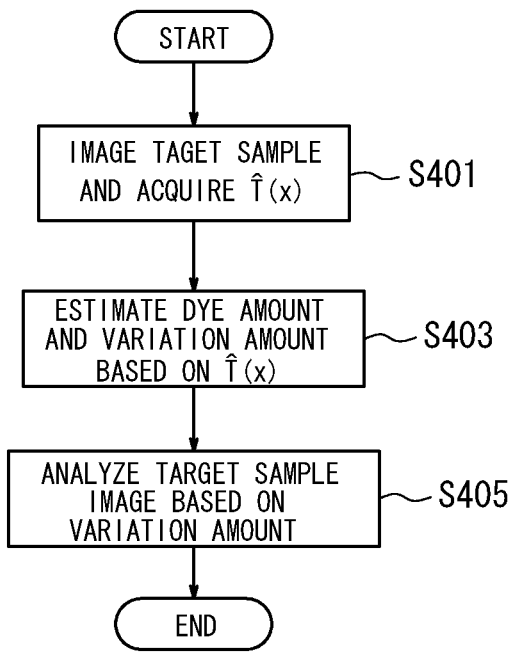
FIG. 4 is a flowchart schematically illustrating the image analysis process of FIG. 2.

FIG. 4 is a flowchart schematically illustrating the image analysis process of FIG. 2. In the image analysis process, the control portion 210 first controls the operation of the image acquiring portion 110 by the image acquisition control portion 211 to image a target sample, and acquires a spectrum T(x) of the target sample (Step S401). Next, the control portion 210 estimates a dye amount and a variation amount for each pixel based on the spectrum T(x) in the dye-amount/variation-amount estimating portion 2503 of the arithmetic portion 250 (Step S403). Here, the variation amount refers to a degree of change in the dye spectrum changing either sharply or gradually in the wavelength direction.

At this time, based on the dye spectra $k_H(\lambda), k_E(\lambda), k_R(\lambda)$ of the dyes used in the staining methods to stain target sample and the variation characteristic $K_E''(\lambda)$, a dye amount and a variation amount of each staining method at a sample point corresponding to an arbitrary point x of the target sample image are estimated. Specifically, based on the estimate value $\hat{T}(x)$ of the spectral transmittance at a point x of the target sample image, a dye amount $\hat{d}_E$ fixed to a sample point of the target sample corresponding to the point x is estimated based on the following Equation (20). Here, $\hat{d}$ means that d has a symbol "^" affixed thereon.

$$\begin{pmatrix} \hat{d}_H \\ \hat{d}_E \\ \hat{d}_E \Delta^2 \lambda_E \\ \hat{d}_R \end{pmatrix} = \begin{pmatrix} k_H(\lambda_1) & k_E(\lambda_1) & k_E''(\lambda_1) & k_R(\lambda_1) \\ k_H(\lambda_2) & k_E(\lambda_2) & k_E''(\lambda_2) & k_R(\lambda_2) \\ k_H(\lambda_3) & k_E(\lambda_3) & k_E''(\lambda_3) & k_R(\lambda_3) \end{pmatrix}^{-1} \begin{pmatrix} \hat{a}(x, \lambda_1) \\ \hat{a}(x, \lambda_2) \\ \hat{a}(x, \lambda_3) \end{pmatrix} \quad (20)$$

Next, $\hat{d}_E \Delta^2 \lambda_E$ is replaced based on the following Equation (21).

$$d_E'' = \hat{d}_E \Delta^2 \lambda_E \quad (21)$$

Then, the variation amount $\Delta^2 \lambda_E$ is calculated based on the following Equation (22).

$$\Delta^2 \lambda_E = \frac{d_E''}{\hat{d}_E} \quad (22)$$

Further, a shift amount $\Delta \lambda_E$ of the dye spectrum in the wavelength direction may also be estimated simultaneously. In this case, the dye amount $\hat{d}_E$ is estimated based on the following Equation (23).

$$\begin{pmatrix} \hat{d}_H \\ \hat{d}_E \\ \hat{d}_E \Delta \lambda_E \\ \hat{d}_E \Delta^2 \lambda_E \\ \hat{d}_R \end{pmatrix} = \begin{pmatrix} k_H(\lambda_1) & k_E(\lambda_1) & k_E'(\lambda_1) & k_E''(\lambda_1) & k_R(\lambda_1) \\ k_H(\lambda_2) & k_E(\lambda_2) & k_E'(\lambda_2) & k_E''(\lambda_2) & k_R(\lambda_2) \\ k_H(\lambda_3) & k_E(\lambda_3) & k_E'(\lambda_3) & k_E''(\lambda_3) & k_R(\lambda_3) \end{pmatrix}^{-1} \begin{pmatrix} \hat{a}(x, \lambda_1) \\ \hat{a}(x, \lambda_2) \\ \hat{a}(x, \lambda_3) \end{pmatrix} \quad (23)$$

Next, $\hat{d}_E \Delta \lambda_E$ is replaced based on the following Equation (24).

$$d_E' = \hat{d}_E \Delta \lambda_E \quad (24)$$

Then, based on the following Equation (25), the shift amount $\Delta \lambda_E$ is calculated.

$$\Delta \lambda_E = \frac{d_E'}{\hat{d}_E} \quad (25)$$

As a result, the dye amount, the shift amount, and the variation amount each reflecting the correlation among respective changes can be estimated.

After that, the control portion 210 analyzes the target sample image based on the variation amount $\Delta^2 \lambda_E$ by the analysis portion 2505 of the arithmetic portion 250 (Step S405). Here, various methods can be conceivable as the analysis method. For example, the accuracy in dye amount estimation may be improved as described later based on the variation characteristic $k_E''(\lambda)$ and the variation amount $\Delta^2 \lambda_E$. Alternatively, based on the variation amount $\Delta^2 \lambda_E$, the image is classified into a plurality of regions through classification process.

As described above, according to the image processing apparatus of this embodiment, the variation characteristic of a dye spectrum representing a phenomenon that the dye spectrum changes either sharply or gradually is quantified and reflected in the analysis of a target sample image, so that the target sample image can be analyzed with high accuracy based on a quantitative value matched to a phenomenon occurring in the target sample. When calculating a plurality of variation amounts simultaneously, the correlation among each variation can be reflected in estimating each variation amounts, which allows the target sample image to be analyzed with further higher accuracy.

Second Embodiment

Figure 5:
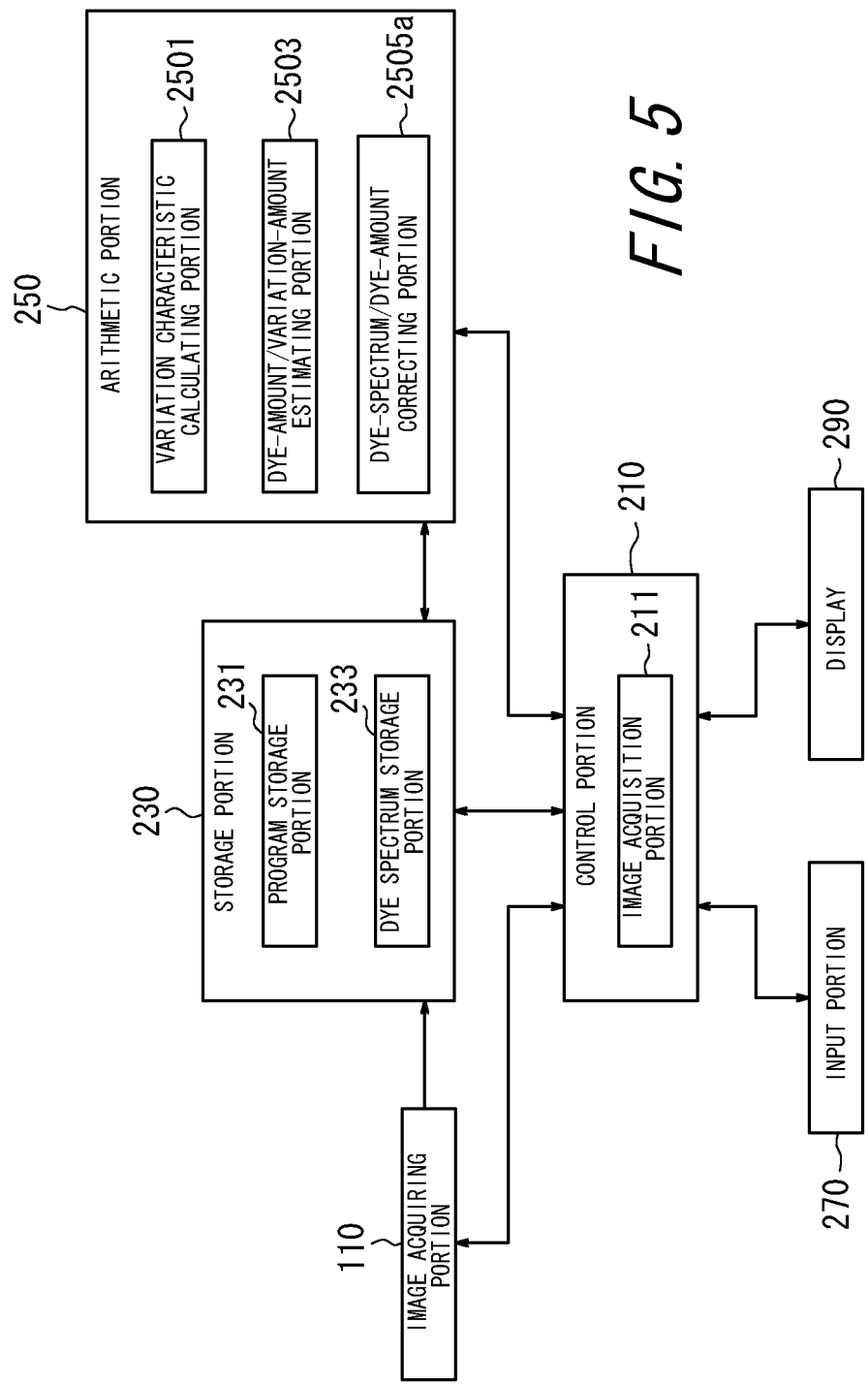
FIG. 5 is a block diagram illustrating a functional configuration of a main part of an image processing apparatus according to a second embodiment of the present invention.

FIG. 5 is a block diagram illustrating a functional configuration of a main part of an image processing apparatus according to a second embodiment of the present invention. The image processing apparatus is similar in configuration to the first embodiment, except in that a dye amount and a dye spectrum are corrected based on a variation amount so as to analyze a target sample image. For this purpose, the arithmetic portion 250 includes a dye-spectrum/dye-amount correcting portion 2505a in place of the analysis portion 1505 of FIG. 1. Other configurations are similar to those of the first embodiment, and therefore the description thereof is omitted.

Figure 6:
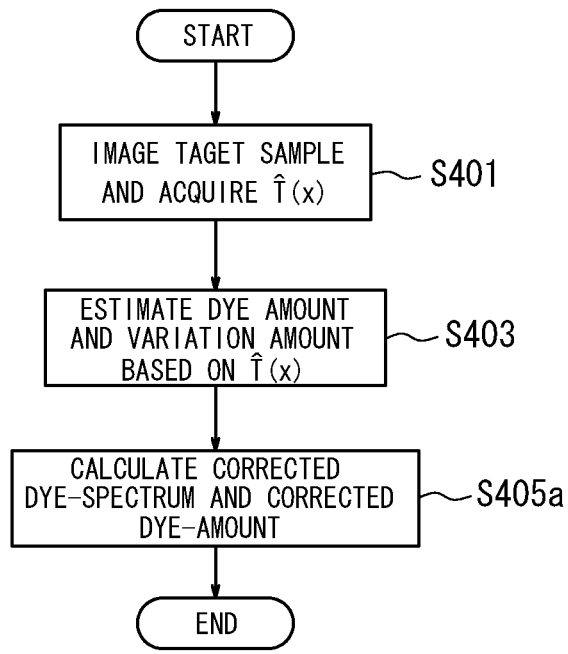
FIG. 6 is a flowchart schematically illustrating an operation of the image processing apparatus of FIG. 5.

FIG. 6 is a flowchart schematically illustrating an operation of the image processing apparatus according to this embodiment, which schematically illustrates the image analysis process of FIG. 2. In the image analysis process according to this embodiment, similarly to the first embodiment, a target sample is imaged so as to acquire the spectrum $\hat{T}(x)$ (Step S401), and further a dye amount and a variation amount are estimated (Step S403). Next, in the dye spectrum/dye amount correcting portion 2505a, a corrected dye spectrum and a corrected dye amount are calculated based on the dye spectrum, the variation characteristic, the dye amount, and the variation amount (Step S405a).

In the following, the process of Step S405a is described. First, based on the dye spectrum $k_E(\lambda)$, the variation characteristic $k_E''(\lambda)$, the dye amount $\hat{d}_E$, and the variation amount $\Delta^2\lambda_E$, the spectrum $a_E(x,\lambda)$ of E stain at an arbitrary point x of a target image is calculated (corrected) based on the following Equation (26).

$$\tilde{a}_E(x,\lambda)=k_E(\lambda)\cdot\hat{d}_E+k_E''(\lambda)\cdot\hat{d}_E\cdot\Delta^2\lambda_E \quad (26)$$

Further, when the variation characteristic $k_E'(\lambda)$ of the shift and the shift amount $\Delta\lambda_E$ are calculated, the spectrum $a_E(x,\lambda)$ of E stain may be calculated based on $k_E'(\lambda)$ and $\Delta\lambda_E$, based on the following Equation (27).

$$\tilde{a}_E(x,\lambda)=k_E(\lambda)\cdot\hat{d}_E+k_E'(\lambda)\cdot\hat{d}_E\cdot\Delta\lambda_E+k_E''(\lambda)\cdot\hat{d}_E\cdot\Delta^2\lambda_E \quad (27)$$

The shift amount $\Delta\lambda_E$ represents a shift in the wavelength direction, and hence the spectrum $a_E(x,\lambda)$ of E stain may be calculated based on the following Equation (28).

$$\tilde{a}_E(x,\lambda)=k_E(\lambda)(\lambda+\Delta\lambda_E)\cdot\hat{d}_E\cdot k_E''(\lambda)\cdot\hat{d}_E\cdot\Delta^2\lambda_E \quad (28)$$

Next, based on the spectrum $k_E(\lambda)$ of the dye E and the spectrum $a_E(x,\lambda)$ of E stain, a corrected dye amount $d_E$ is calculated from the following Equation (29).

$$\tilde{d}_E = \frac{\sum_j \tilde{a}_E(x,\lambda_j)}{\sum_i k_E(\lambda_i)} \quad (29)$$

According to the above Equation (29), a value obtained by integrating the spectrum $a_E(x,\lambda)$ of E stain at the point x in the wavelength direction is divided by a value obtained by integrating the dye spectrum $k_E(\lambda)$ in the wavelength direction, so that the dye amount can be calculated as a relative amount in the absorbance space.

Next, based on the spectrum $a_E(x,\lambda)$ of E stain and the corrected dye amount $d_E$, the corrected spectrum $k_E(\lambda)$ of the dye E is calculated from the following Equation (30). Here, k means that k has a symbol "~" affixed thereon.

$$\tilde{k}_E(\lambda) = \frac{\tilde{a}_E(x,\lambda)}{\tilde{d}_E} \quad (30)$$

In this way, the corrected spectrum $k_E(\lambda)$ of the dye E and the spectrum $k_E(\lambda)$ of the dye E are made equivalent in the absorbance space.

As described above, according to the image processing apparatus of this embodiment, the dye amount and the dye spectrum can be corrected in line with a phenomenon that the dye spectrum of a target sample suffers a change. As a result, a target sample image can be analyzed with high accuracy.

Third Embodiment

Figure 7:
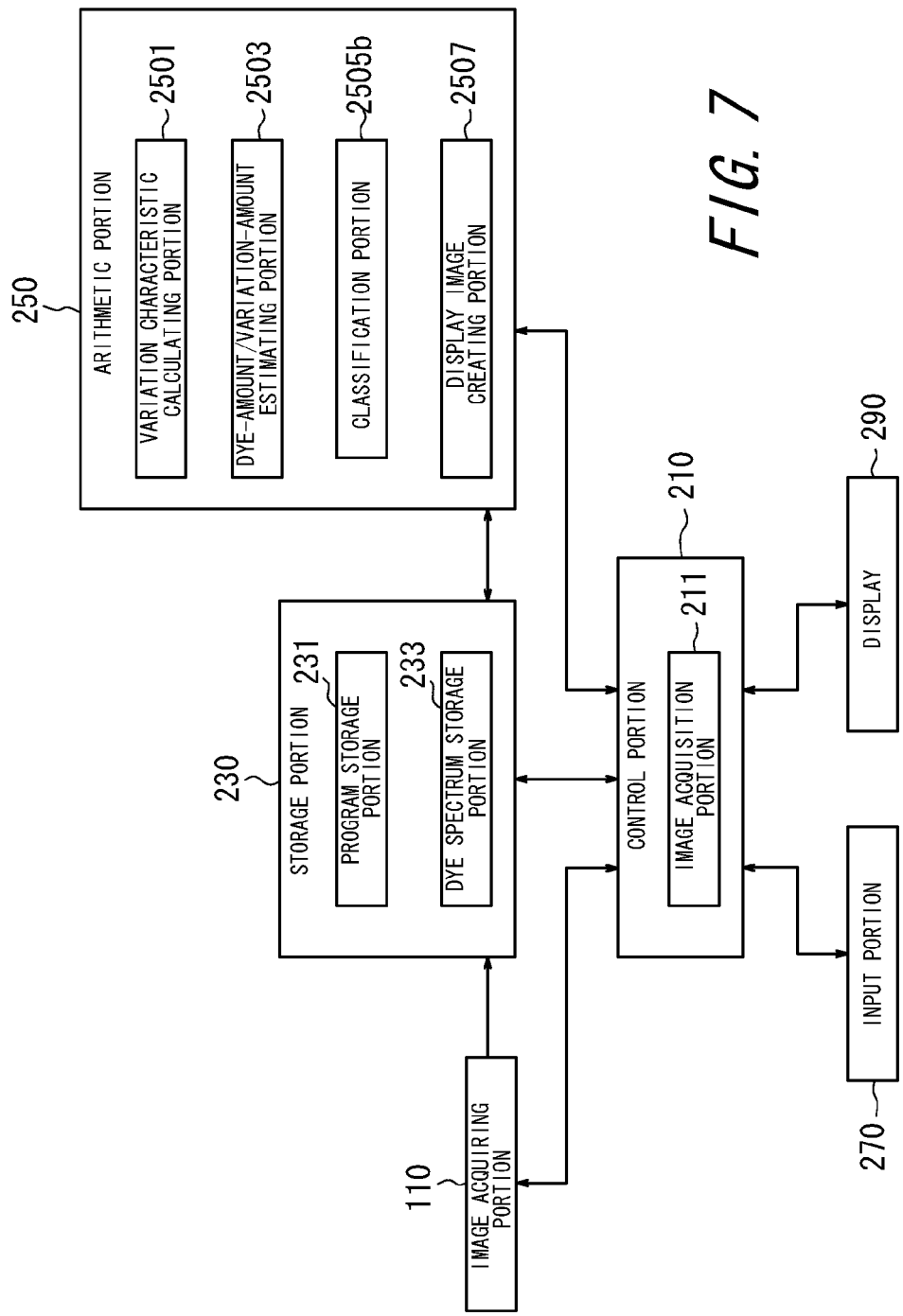
FIG. 7 is a block diagram illustrating a functional configuration of a main part of an image processing apparatus according to a third embodiment of the present invention.

FIG. 7 is a block diagram illustrating a functional configuration of a main part of an image processing apparatus according to a third embodiment of the present invention. The image processing apparatus is similar in configuration to the first embodiment, except in that pixels are classified based on the variation amount. For this purpose, the arithmetic portion 250 includes, in place of the analysis portion 1505 of FIG. 1, a classification portion 2505b for classifying pixels based on the variation amount. The arithmetic portion 250 further includes a display image creating portion 2507 for creating a display image based on the result of pixel classification made by the classification portion 2505b. Other configurations are similar to those of the first embodiment, and therefore the description thereof is omitted.

Figure 8:
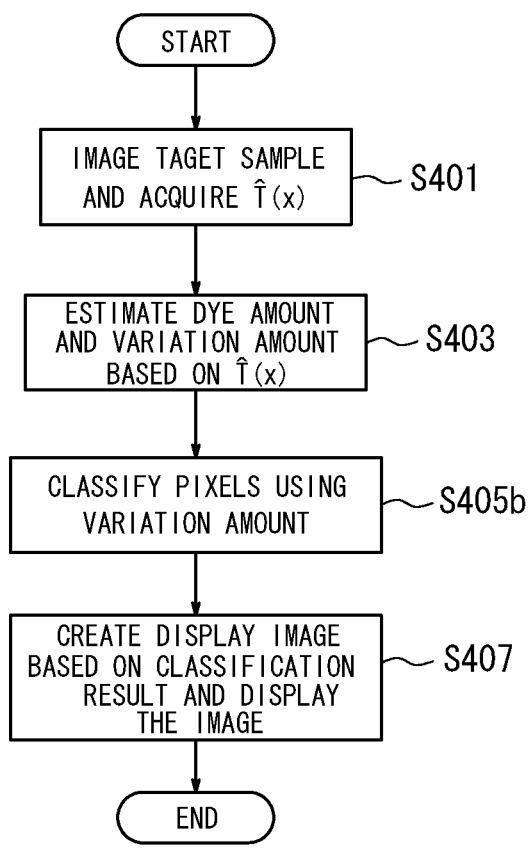
FIG. 8 is a flowchart schematically illustrating an operation of the image processing apparatus of FIG. 7.

FIG. 8 is a flowchart schematically illustrating an operation of the image processing apparatus according to this embodiment, which schematically illustrates the image analysis process of FIG. 2. In the image analysis process according to this embodiment, similarly to the first embodiment, a target sample is imaged so as to acquire the spectrum T^(x) (Step S401), and further a dye amount and a variation amount are estimated (Step S403). Next, in the classification portion 2505b, pixels are discriminated from one another based on the variation amount $\Delta^2\lambda_E$ (Step S405b).

Here, when a muscle fiber and a collagen fiber are compared, the variation amount for E stain of a muscle fiber is relatively larger. Therefore, when the variation amount $\Delta^2\lambda_E$ is equal to or larger than a threshold value, for example, the pixel may be determined as corresponding to a muscle fiber, and when the variation amount $\Delta^2\lambda_E$ is equal to or smaller than a threshold value, for example, the pixel may be determined as corresponding to a collagen fiber. Here, pixels may be classified through classification process such as the K-means method. Further, pixels may be classified based on the dye amounts $\hat{d}_H$, $\hat{d}_E$ and the variation amount $\Delta^2\lambda_E$, so as to exclude pixels corresponding to cell nuclei, which are large in dye amount of $\hat{d}_H$, and pixels corresponding to a cell cavity, which is small in dye amount $\hat{d}_E$.

Here, the K-means method is a simple technique of nonhierarchical clustering, and also referred to as K-means. The K-means method is generally implemented according to the following procedure, so that data is classified into given K number of clusters using cluster means.

(1) The number of data items is set to n, and the number of clusters is set to K.
(2) The clusters are randomly assigned to data items.
(3) The center of each cluster is calculated based on the data items assigned with the cluster. In general, the mean of each element in the data items assigned with the cluster is used in the calculation.
(4) The distance between each data item and the center of each cluster is obtained, and the data items are each reassigned with a cluster having a center closest to the data item.
(5) When there is no change in the cluster assignment, the above-mentioned process is terminated. Until then, the center of each cluster is recalculated based on the reassigned clusters, and the above-mentioned process is repeated.

The classification results obtained by the K-means method largely depend on the random assignment of clusters at the start. Accordingly, the range between the minimum value and the maximum value of the data may be equally divided and assigned with clusters. In this manner, the results may be constantly converged on equal values.

Next, the control portion 210 creates a display image by the display image creating portion 2507, based on the pixel classification results obtained by the classification portion 2505b, and displays the image on the display 290 (Step S407). Specifically, in order to make muscle fibers and collagen fibers visually distinguishable from each other, for example, the image may be colored with different colors or superposed with different textures based on the classification results, so as to serve as a display image to be displayed.

As described above, according to the image processing apparatus of this embodiment, pixels are classified based on the variation amount, which means that the pixels can be classified based on the characteristic amount in line with a phenomenon occurring in the target sample, without depending on the dye amount. Specifically, a classification is made of muscle fibers and collagen fibers. Further, the classification result is displayed as an image, which allows the classification result to be visually identified. In this manner, a target sample image can be easily analyzed with high accuracy.

Fourth Embodiment

Figure 9:
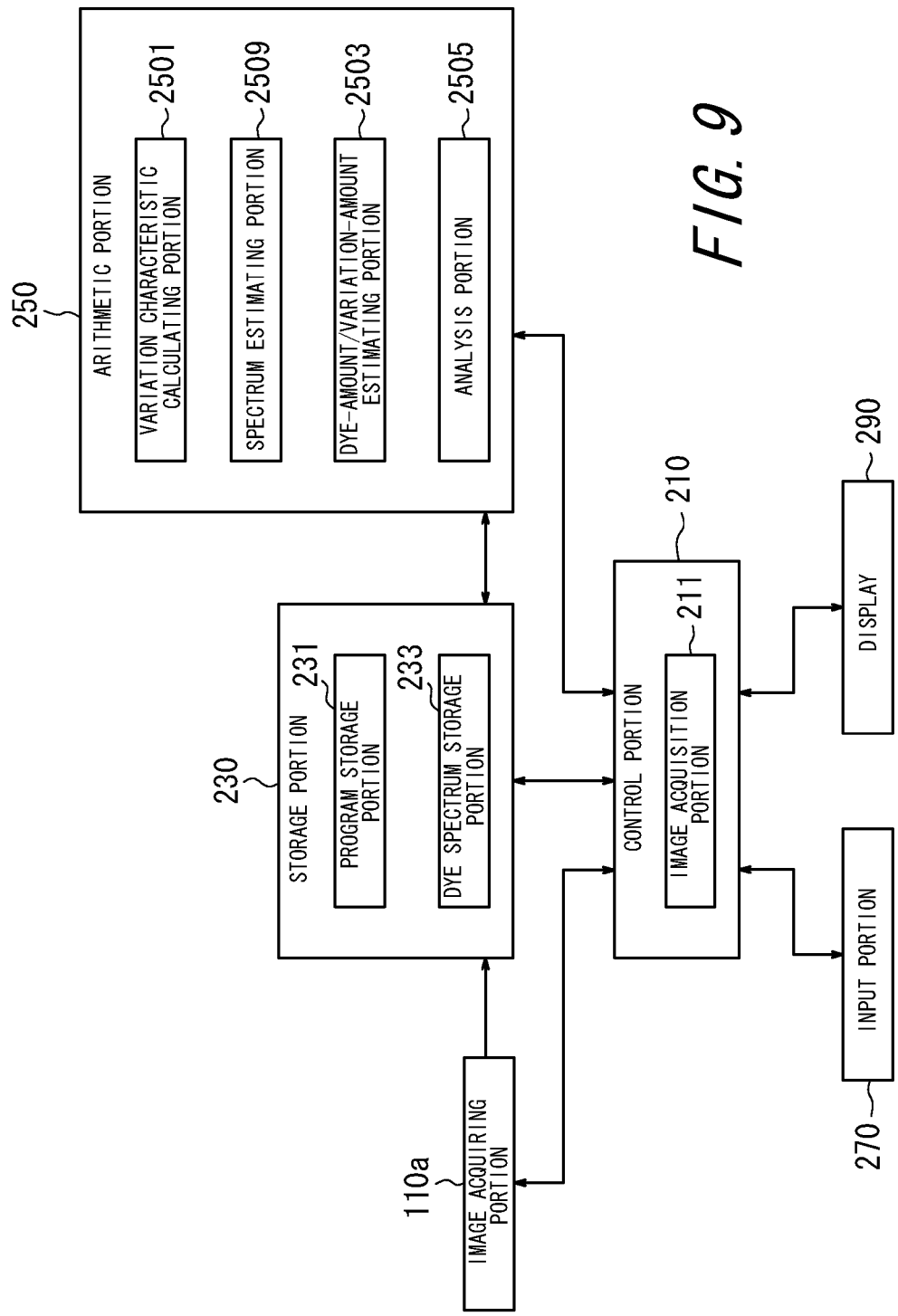
FIG. 9 is a block diagram illustrating a functional configuration of a main part of an image processing apparatus according to a fourth embodiment of the present invention.

FIG. 9 is a block diagram illustrating a functional configuration of a main part of an image processing apparatus according to a fourth embodiment of the present invention. The image processing apparatus is similarly configured to the first embodiment, except in that the spectrum is estimated from a pixel value. For this purpose, the arithmetic portion 250 additionally includes a spectrum estimating portion 2509. Further, as described later, the image acquiring portion 110a is configured by using an RGB camera and a filter portion. Other configurations are similar to those of the first embodiment, and therefore the description thereof is omitted.

Figure 10:
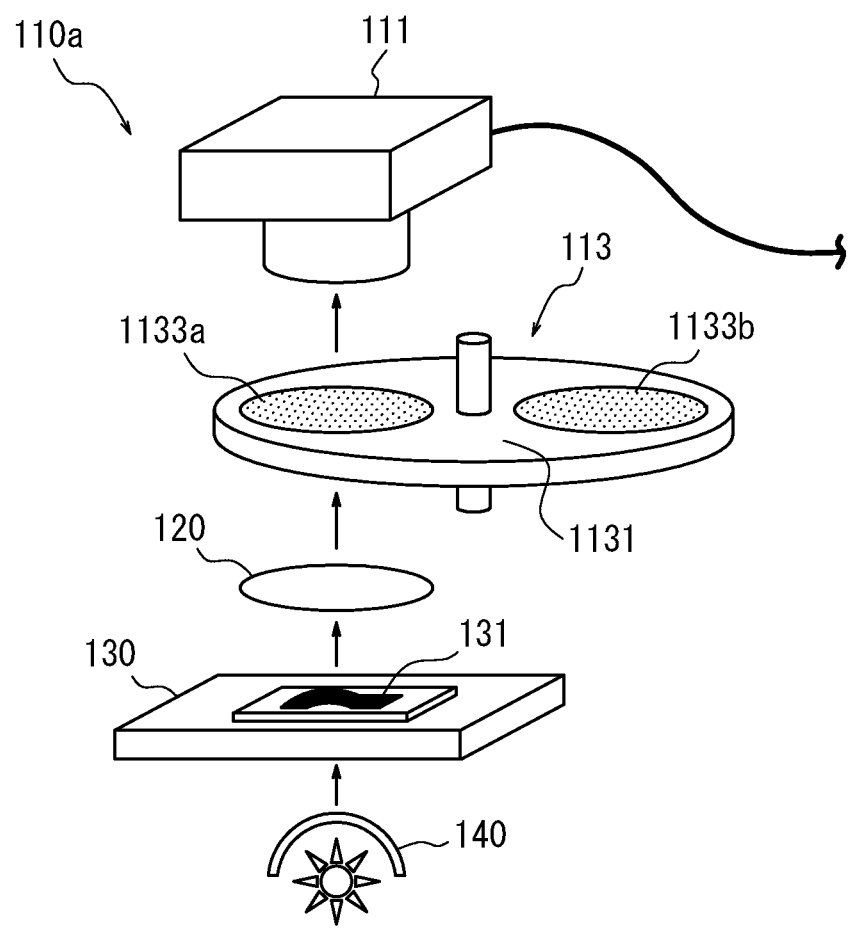
FIG. 10 is a diagram illustrating a schematic configuration of the image acquiring portion of FIG. 9.

FIG. 10 is a diagram illustrating a schematic configuration of the image acquiring portion 110a. The image acquiring portion 110a is for acquiring a multiband image (6-band image in this case), and includes an RGB camera 111 and a filter portion 113 for limiting, to a predetermined range, the wavelength band of light forming an image in the RGB camera 111.

Figure 11:
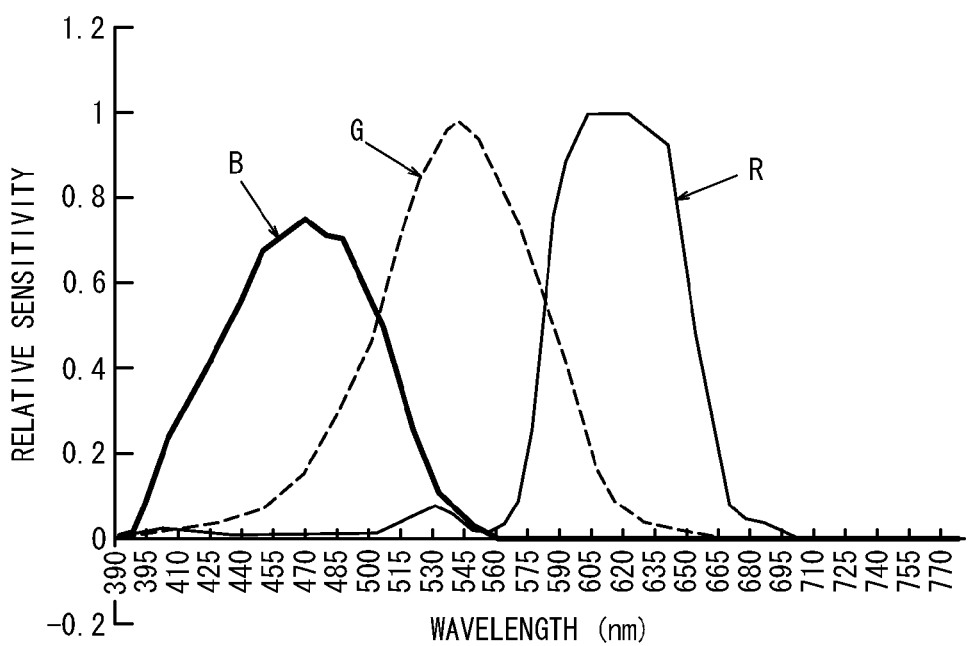
FIG. 11 is a graph showing the spectral sensitivity characteristics of the RGB camera of FIG. 10.
Figure 12A:
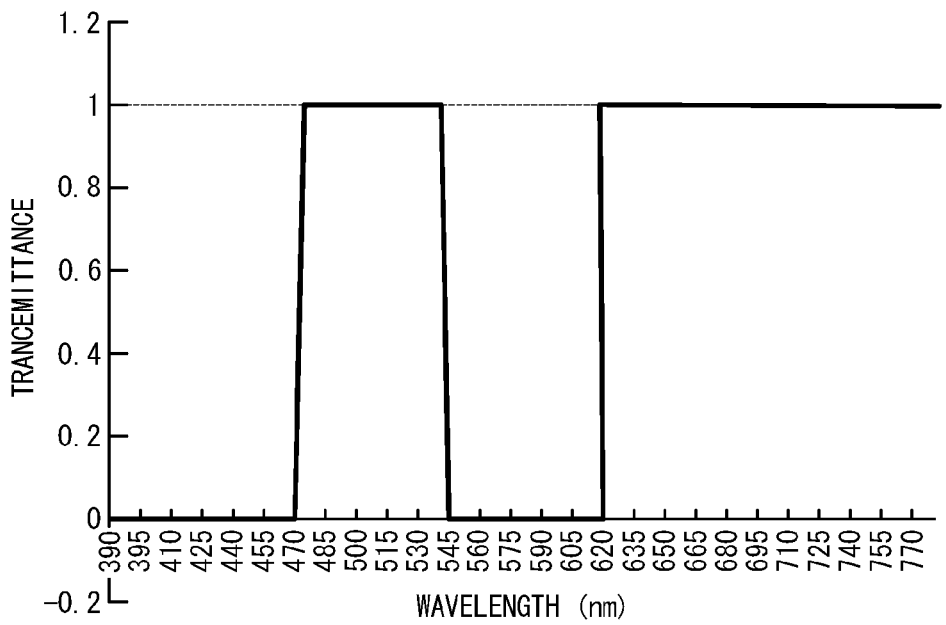
FIG. 12A is a graph showing the spectral transmittance characteristic of the one of the optical filters constituting the filter portion of FIG. 10.
Figure 12B:
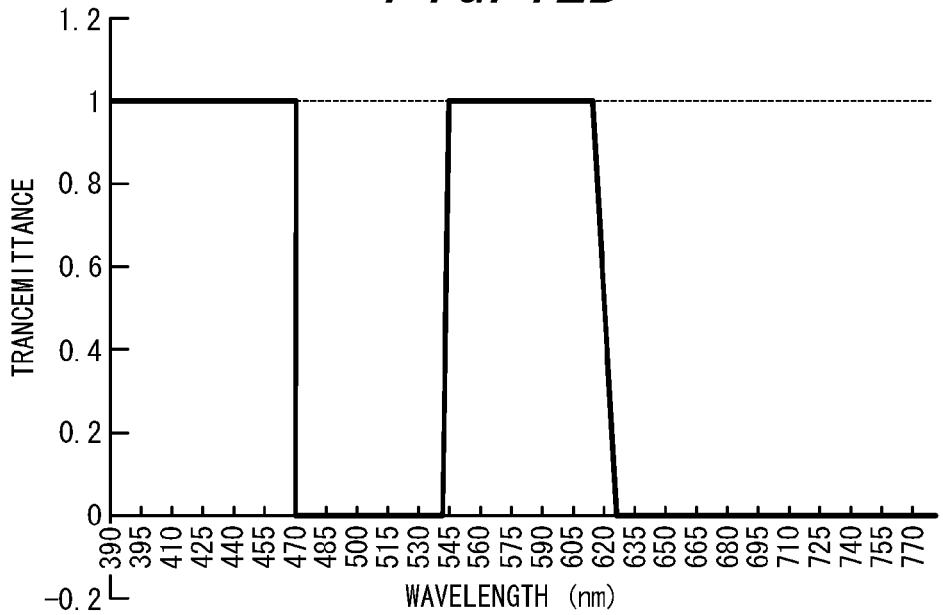
FIG. 12B is a graph showing the spectral transmittance characteristic of another one of the optical filters constituting the filter portion of FIG. 10.

The RGB camera 111 includes an image sensor such as a charge coupled device (CCD) or a complementary metal oxide semiconductor (CMOS), and has a spectral sensitivity characteristic for each band of R (red), G (green), and B (blue) as shown, for example, in FIG. 11. The filter portion 113 is for limiting, to a predetermined range, the wavelength band of light forming an image in the RGB camera 111, and includes a rotary filter switching portion 1131. The filter switching portion 1131 holds two optical filters 1133a, 1133b having spectral transmittance characteristics different from each other so as to divide in two the transmission wavelength range of each band of R, G, B. FIG. 12A shows the spectral transmittance characteristic of the optical filter 1133a on the one hand, while FIG. 12B shows the spectral transmittance characteristic of the optical filter 1133b on the other hand.

Then, the control portion 210 causes, for example, the optical filter 1133a to be disposed on an optical path leading to the RGB camera 111 from an illuminating portion 140, so as to illuminate, by the illuminating portion 140, a target sample 131 placed on a light receiving position moving portion 130, and the transmitted light passes through the imaging lens 120 and the optical filter 1133a so as to be imaged in the RGB camera 111, to thereby perform first imaging. Next, the control portion 210 causes the filter switching portion 1131 to rotate, so that the optical filter 1131b is disposed on the optical path leading to the RGB camera 111 from the illuminating portion 140, to thereby similarly perform second imaging.

As a result, 3-band images different from each other are obtained by the first imaging and the second imaging, respectively, so as to acquire a multiband image having 6 bands in total. The image of the target sample 131 thus acquired is stored in the storage portion 230. The number of optical filters to be provided to the filter portion 113 is not limited to two, and three or more optical filters may be used to acquire a multiband image which includes further more bands. Alternatively, the filter portion 113 may be omitted, and the image acquiring portion 110 may be configured to acquire only an RGB image by the RGB camera 111.

Figure 13:
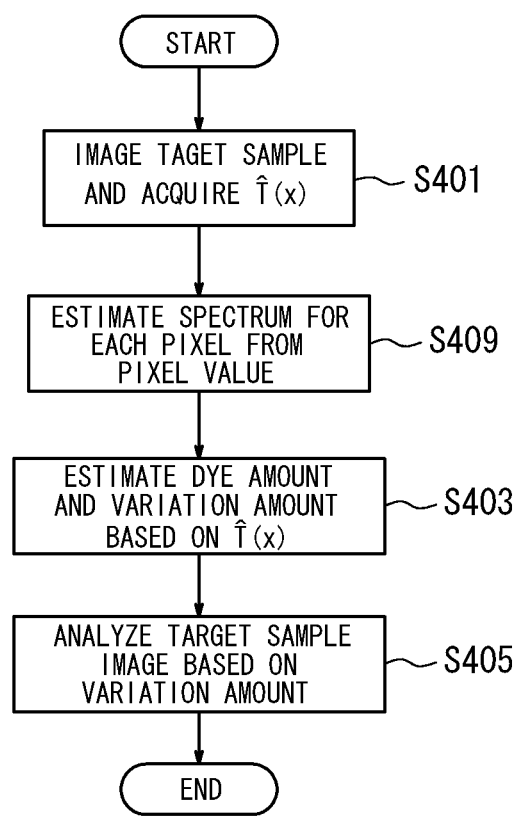
FIG. 13 is a flowchart schematically illustrating an operation of the image processing apparatus of FIG. 9.

FIG. 13 is a flowchart schematically illustrating an operation of the image processing apparatus according to this embodiment, which schematically illustrates the image analysis process of FIG. 2. In the image analysis process according to this embodiment, similarly to the first embodiment, a target sample is imaged and a spectrum $\hat{T}(x)$ is acquired (Step S401), and then a spectrum is estimated based on the pixel value by the spectrum estimating portion 2509 in the arithmetic portion 250 (Step S409). That is, based on the above-mentioned Equation (5), the pixel value $G(x)$ of the estimation target pixel is used to calculate an estimate value $\hat{T}(x)$ of the spectral transmittance at a corresponding sample point of the target sample. Equation (5) is shown again below.

$$\hat{T}(x) = WG(x) \quad (5)$$

After that, based on the estimate value $\hat{T}(x)$ of the spectral transmittance estimated by the spectrum estimating portion 2509, the dye amount and the variation amount are estimated in the dye-amount/variation-amount estimating portion 2503, similarly to the first embodiment (Step S403), and then the target sample image is analyzed in the analysis portion 2505 based on the variation amount $\Delta^2 \lambda_E$ (Step S405).

As described above, according to the image processing apparatus of this embodiment, an optical spectrum is estimated based on the pixel values of the pixels of a target sample image obtained by taking an image of the target sample 131, so that the target sample image can be analyzed with high accuracy regardless of whether it is a multiband image or an RGB image. Therefore, there is also produced an advantage that the image acquiring portion 110a may be simply configured.

Fifth Embodiment

Figure 14:
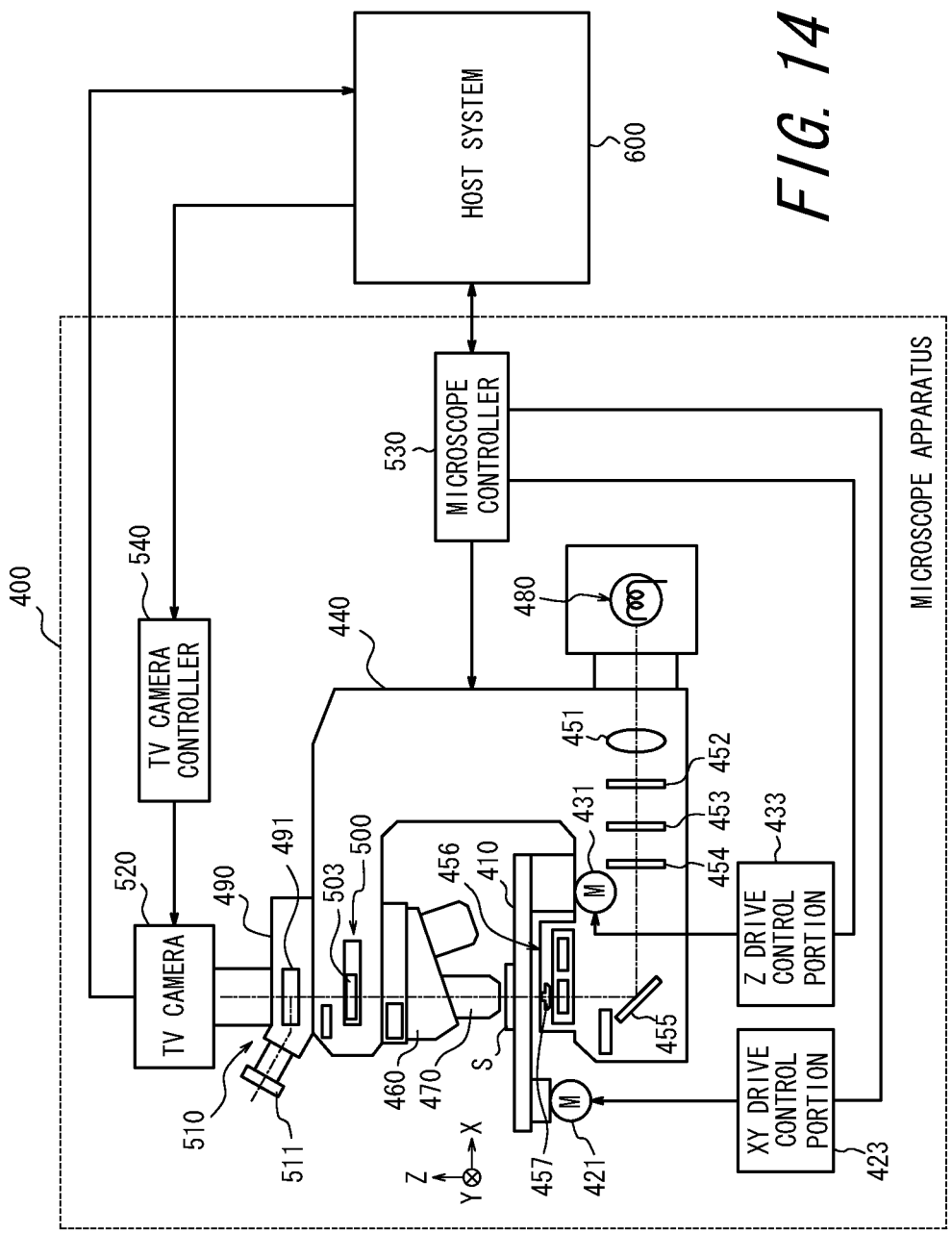
FIG. 14 is a block diagram illustrating a functional configuration of a main part of a virtual microscope system according to a fifth embodiment of the present invention.
Figure 15A:
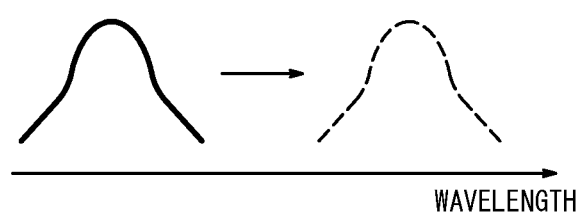
FIG. 15A schematically shows a dye spectrum shifting.
Figure 15B:
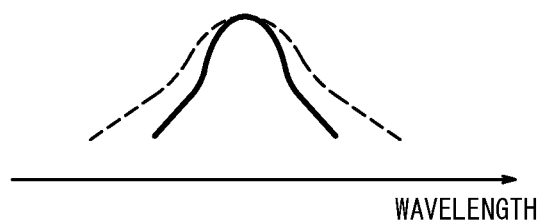
FIG. 15B schematically shows a dye spectrum changing either sharply or gradually in the wavelength direction.
Figure 16A:
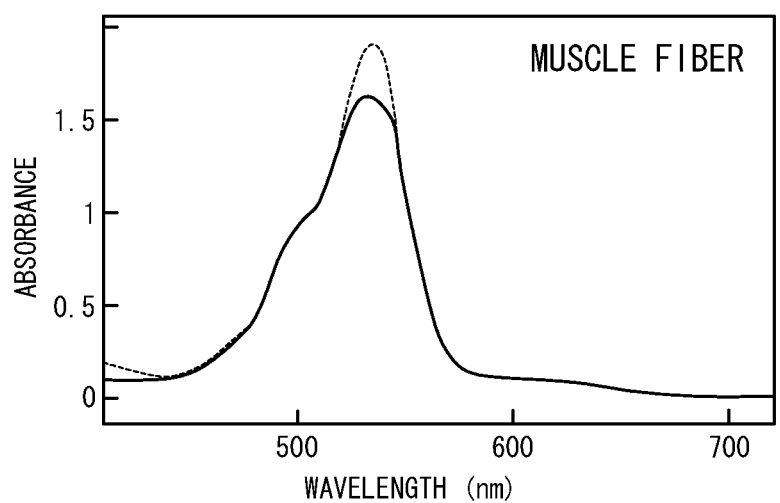
FIG. 16A is a graph showing an example of a measured value and an estimate value of the absorbance spectrum of a muscle fiber in an H&E stained sample, the estimate value being obtained through a conventional method of estimating a dye amount.
Figure 16B:
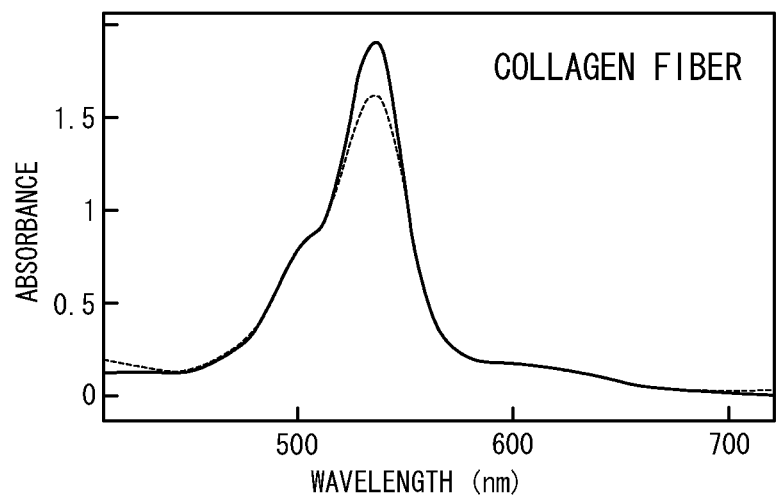
FIG. 16B is a graph showing an example of a measured value and an estimate value of the absorbance spectrum of a collagen fiber in an H&E stained sample, the estimate value being obtained through a conventional method of estimating a dye amount.
Figure 17A:
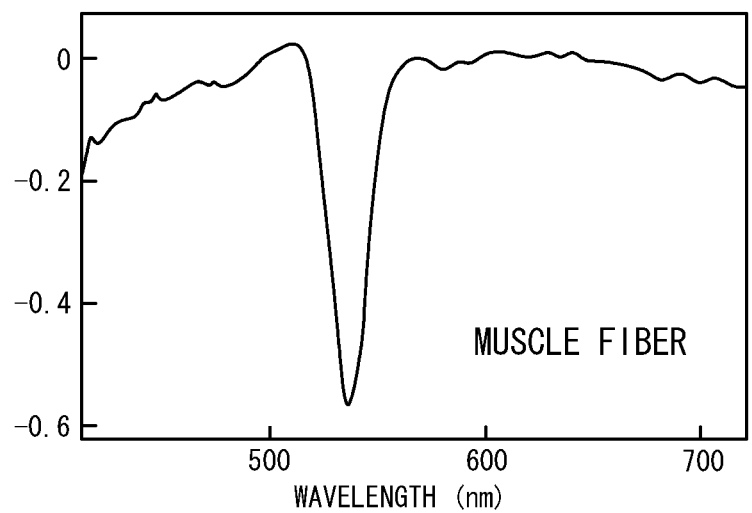
FIG. 17A is a graph showing a residual spectrum between the actual measured value and the estimate value of the absorbance spectrum in the case of the muscle fiber of FIG. 16A.
Figure 17B:
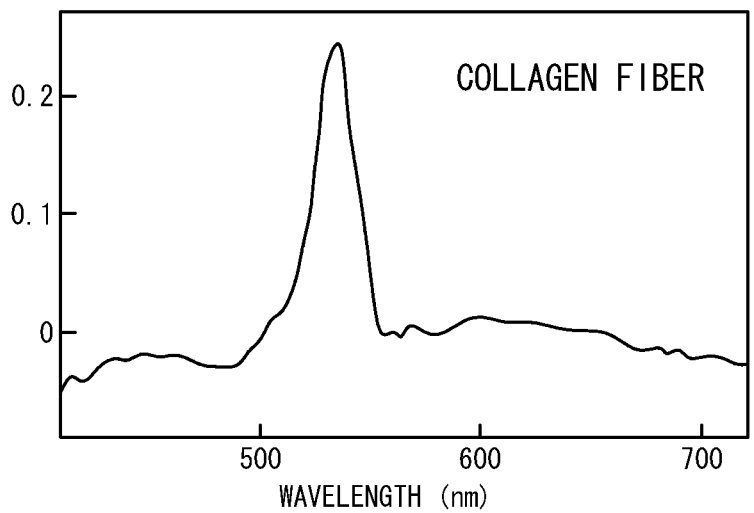
FIG. 17B is a graph showing a residual spectrum between the actual measured value and the estimate value of the absorbance spectrum in the case of the collagen fiber of FIG. 16B.

FIG. 14 is a block diagram illustrating a functional configuration of a main part of a virtual microscope system according to a fifth embodiment of the present invention. The virtual microscope system serves to acquire a virtual slide image of a stained sample, and includes a microscope apparatus 400 and a host system 600.

The microscope apparatus 400 includes: an electrically-driven stage 410 for having a target sample (see "S") to be placed thereon; a microscope main body 440 having a substantially U shape in side view, for supporting the electrically-driven stage 410 and holding an objective lens 470 via a revolver 460; a light source 480 disposed in the rear at the bottom of the microscope main body 440; and a lens barrel 490 placed on top of the microscope main body 440. The lens barrel 490 is provided with a binocular portion 510 for visually observing a sample image of the target sample S and a TV camera 520 for capturing a sample image of the target sample S. In other words, the microscope apparatus 400 corresponds to the image acquiring portion 110a of FIG. 9. Here, the optical axis direction of the objective lens 470 is defined as Z direction, and a plane perpendicular to the Z direction is defined as XY plane.

The electrically-driven stage 410 is configured to be movable in the X, Y, and Z directions. In other words, the electrically-driven stage 410 is made movable within the XY plane by a motor 421 and an XY drive control portion 423 for controlling the drive of the motor 421. The XY drive control portion 423 detects a predetermined origin position of the electrically-driven stage 410 in the XY plane by an XY position origin sensor under the control of a microscope controller 530, and controls a drive amount of the motor 421, with the origin position as the base point, to thereby shift an observation point on the target sample S. The XY drive control portion 423 outputs as appropriate the X position and the Y position of the electrically-driven stage 410 during observation, to the microscope controller 530.

The electrically-driven stage 410 is movable in the Z direction by a motor 431 and a Z drive control portion 433 for controlling the drive of the motor 431. The Z drive control portion 433 detects a predetermined origin position of the electrically-driven stage 410 in the Z direction by a Z position origin sensor under the control of the microscope controller 530, and controls a drive amount of the motor 431, with the origin position as the base point, to thereby focus-adjustingly shift the target sample S to an arbitrary Z position within a predetermined height range. The Z drive control portion 433 outputs as appropriate the Z position of the electrically-driven stage 410 during observation, to the microscope controller 530.

The revolver 460 is held rotatable relative to the microscope main body 440, and disposes the objective lens 470 above the target sample S. The objective lens 470 is detachably mounted on the revolver 460 together with other objective lenses having different magnifications (observation magnifications), and shifted to be located on the optical path of observation light in accordance with the rotation of the revolver 460, so that an objective lens 470 for use in observation of the target sample S may be selectively switched.

The microscope main body 440 includes therein an illumination optical system for illuminating the target sample S with transmitted light at the bottom portion thereof. The illumination optical system includes: a collector lens 451 for collecting illumination light emitted from the light source 480; an illumination system filter unit 452; a field stop 453; an aperture stop 454; a fold mirror 455 for deflecting the optical path of the illumination light along the optical path of the objective lens 470; a condenser optical element unit 456; a top lens unit 457; and the like, which are disposed at appropriate positions along the optical path of illumination light. Illumination light emitted from the light source 480 is irradiated onto the target sample S by the illumination optical system and the transmitted light is incident on the objective lens 470 as observation light.

Further, the microscope main body 440 includes therein a filer unit 500 in the upper portion thereof. The filter unit 500 holds at least two optical filters 503 rotatable to limit a wavelength region of light to be imaged as a sample image to a predetermined range. The optical filter 503 is shifted as appropriate to be located on the optical path of observation light downstream of the objective lens 470. The filter unit 500 corresponds to the filter portion 113 of FIG. 10. Although exemplified herein is a case where the optical filter 503 is disposed downstream of the objective lens 470, the present embodiment is not limited thereto and the optical filter 503 may be disposed at any position along the optical path leading to the TV camera 520 from the light source 480. The observation light passing through the objective lens 470 is incident on the lens barrel 490 via the filter unit 500.

The lens barrel 490 includes therein a beam splitter 491 for switching the optical path of the observation light from the filter unit 500 to introduce the light into the binocular portion 510 or the TV camera 520. A sample image of the target sample S is introduced into the binocular portion 510 by the beam splitter 491 and visually observed by an operator via an eyepiece lens 511. Alternatively, the sample image of the target sample S is captured by the TV camera 520. The TV camera 520 is provided with an image sensor such as a CCD or a CMOS for capturing a sample image (specifically, a sample image within the visual range of the objective lens 470), so as to capture a sample image and output the image data of the sample image to the host system 600. That is, the TV camera 520 corresponds to the RGB camera 111 of FIG. 10.

Further, the microscope apparatus 400 includes a microscope controller 530 and a TV camera controller 540. The microscope controller 530 comprehensively controls operations of the respective components constituting the microscope apparatus 400 under the control of the host system 600. For example, the microscope controller 530 carries out various adjustments of the respective components of the microscope apparatus 400 in association with observation of the target sample S, which adjustments include: a process of rotating the revolver 460 to switch one objective lens 470 disposed on the optical path of observation light to another objective lens; light-adjusting control of the light source 480 and/or switching of various optical elements in accordance with the magnification or the like of the objective lens 470 thus switched; instructions to the XY drive control portion 423 and/or the Z drive control portion 433 to move the electrically-driven stage 410; and the like. The microscope controller 530 also notifies the host system 600 of the states of the respective portions as appropriate.

The TV camera controller 540 drives the TV camera 520 by carrying out ON/OFF switching of automatic gain control, setting of gain, ON/OFF switching of automatic exposure control, setting of exposure time, and the like, under the control of the host system 600, thereby controlling the image capturing operation of the TV camera 520.

Meanwhile, the host system 600 includes the input portion 270, the display 290, the arithmetic portion 250, the storage portion 230 and the control portion 210 illustrated in any one of the first to fourth embodiments. The host system 600 can be realized by a known hardware structure including: CPU and video board; a main storage device such as a a main memory (RAM); an external storage device such as a hard disk and various memory media; a communication device; an output device such as a display device and a printing device; an input device; and an interface device for effecting connection with an external input. For example, a general purpose computer such as a work station and a personal computer can be employed as the host system 600.

The virtual microscope system according to this embodiment controls the operations of respective components including the microscope apparatus 400, according to a VS image generation program including the image processing program stored in the storage portion of the host system 600. As a result, the TV camera 520 of the microscope apparatus 400 subjects the target sample S to partial multiband imaging so as to obtain a plurality of target sample images, which are each processed as described above with reference to the first to fourth embodiments, to thereby generate a virtual slide (VS) image. The VS image data (multiband image data) is stored in the storage portion of the host system 600.

Here, the VS image generating program is a program for implementing a process of generating a VS image of a target sample. The VS image is obtained by putting together one or more multiband images captured by the microscope apparatus 400. For example, a plurality of high-resolution images of the target sample S are captured for each part thereof by using a high-power objective lens 470, and those images are put together to thereby generate an VS image. The VS image refers to a wide-field and high-definition multiband image reflecting the entire area of the target sample S.

The host system 600 provides instruction and transfers data to the respective components constituting the host system 600, based on an input signal input from the input portion 270 illustrated in the first to fourth embodiment, the states of respective components of the microscope apparatus 400 input from the microscope controller 530, image data input from the TV camera 520, and programs and data stored in the storage portion 230 illustrated in the first to fourth embodiment. The host system 600 further provides operation instruction to the respective portions of the microscope apparatus 400 with respect to the microscope controller 530 and the TV camera controller 540, to thereby perform overall control of the entire operation of the virtual microscope system.

Therefore, according to the virtual microscope system of this embodiment, there may be produced the same effects similar to those of the image processing apparatus described with reference to the first to fourth embodiment.

The present invention is not limited to the above-mentioned embodiments, and may be subjected to various modifications and alterations. For example, according to the first to fourth embodiment, the image acquiring portion is provided with a function of capturing an image of a target sample. However, without being provided with the function of capturing an image, the image acquiring portion may take in, via a storage medium or a communication line, stained image data of the target sample obtained by separately capturing images of the sample.

Further, the present invention is not limited to the image processing apparatus or the virtual microscope system described above, and may be implemented by an image processing method, an image processing program, and a storage medium storing programs, which are for substantially carrying out those processes. Therefore, it should be understood that the method, the program, and the medium described above may also be embodied by the present invention.

DESCRIPTION OF SYMBOLS 110, 110a image acquiring portion
210 control portion
230 storage portion
233 dye spectrum storage portion
250 arithmetic portion
2501 variation characteristic calculating portion
2503 dye-amount/variation-amount estimating portion
2505 analysis portion
2505a dye-spectrum/dye-amount correcting portion
2505b classification portion
2507 display image creating portion
2509 spectrum estimating portion
270 input portion
290 display
400 microscope apparatus
600 host system

The invention claimed is:

1. An image processing apparatus for processing a stained sample image obtained by imaging a stained sample, the image processing apparatus comprising:
a dye spectrum storage portion for storing a dye spectrum of a dye used in staining the stained sample; and
an arithmetic portion including a variation characteristic calculating portion and a dye-amount/variation-amount estimating portion, the variation characteristic calculating portion calculating a variation characteristic based on the dye spectrum stored in the dye spectrum storage portion, the variation characteristic representing either a sharp or gradual change of the dye spectrum in the wavelength direction, the dye-amount/variation-amount estimating portion estimating, based on the dye spectrum stored in the dye spectrum storage portion and the variation characteristic calculated by the variation characteristic calculating portion, a dye-amount and a variation amount based on the variation characteristic from a pixel value of each pixel forming the stained sample image, the arithmetic portion analyzing the stained sample image at least based on the variation amount.

2. The image processing apparatus according to claim 1, wherein the variation amount calculating portion calculates, as the variation characteristic, a second-order derivative spectrum obtained by subjecting the dye spectrum to a second-order differentiation.

3. The image processing apparatus according to claim 1, wherein the arithmetic portion further includes a dye-spectrum/dye-amount correcting portion for correcting the dye spectrum and the dye amount, respectively, based on the dye spectrum, the variation characteristic, the dye amount, and the variation amount, and
wherein the arithmetic portion is configured to analyze the stained sample image, based on the corrected dye spectrum and the corrected dye amount.

4. The image processing apparatus according to claim 1, wherein the arithmetic portion further includes a classification portion for classifying each pixel forming the stained sample image, based on the variation amount, and
wherein the arithmetic portion is configured to analyze the stained sample image, based on the classification results obtained by the classification portion.

5. The image processing apparatus according to claim 4, wherein the stained sample is an H&E stained sample, wherein the dye spectrum is a spectrum of E dye, and
wherein the classification portion distinguishes, based on the variation amount, at least one of a muscle fiber and a collagen fiber from the other.

6. The image processing apparatus according claim 4, further comprising a display image creating portion for creating a display image, based on the classification results obtained by the classification portion.

7. The image processing apparatus according to claim 1, wherein the arithmetic portion further includes a spectrum estimating portion for estimating an optical spectrum, based on a pixel value of each pixel forming the stained sample image, and
wherein the dye-amount/variation-amount estimating portion estimates, based on the optical spectrum estimated by the spectrum estimating portion, the dye amount and the variation amount.

8. The image processing apparatus according to claim 1, wherein the variation characteristic calculating portion calculates, based on the dye spectrum, a plurality of variation characteristics including a variation characteristic representing a change different from the change represented by the variation characteristic,
wherein the dye-amount/variation-amount estimating portion estimates, based on the dye spectrum and the plurality of variation characteristics calculated by the variation characteristic calculating portion, a plurality of variation amounts including the variation amount, the plurality of variation amounts being different from each other, and
wherein the arithmetic portion analyzes the stained sample image, based on the plurality of variation amounts.

9. An image processing method of processing a stained sample image obtained by imaging a stained sample, the method comprising the steps of:
acquiring a dye spectrum of a dye used in staining the stained sample;
calculating, based on the dye spectrum thus acquired, a variation characteristic at least representing either a sharp or gradual change of the dye spectrum in the wavelength direction;
estimating, based on the dye spectrum and the variation characteristic, a dye-amount and a variation amount based on the variation characteristic from a pixel value of each pixel forming the stained sample image; and analyzing the stained sample image at least based on the variation amount.

10. A non-transitory computer-readable storage medium having an image processing program, for processing a stained sample image obtained by imaging a stained sample, recorded thereon, the program causing a computer to execute the processes of:

acquiring a dye spectrum of a dye used in staining the stained sample;

calculating, based on the dye spectrum thus acquired, a variation characteristic at least representing either a sharp or gradual change of the dye spectrum in the wavelength direction;

estimating, based on the dye spectrum and the variation characteristic, a dye-amount and a variation amount based on the variation characteristic from a pixel value of each pixel forming the stained sample image; and analyzing the stained sample image at least based on the variation amount.

11. A virtual microscope system for acquiring a virtual slide image of a stained sample, comprising:

an image acquiring portion for acquiring a stained sample image by imaging the stained sample using a microscope;

a dye spectrum storage portion for storing a dye spectrum of a dye used in staining the stained sample; and an arithmetic portion including a variation characteristic calculating portion and a dye-amount/variation-amount estimating portion, the variation characteristic calculating portion calculating a variation characteristic based on the dye spectrum stored in the dye spectrum storage portion, the variation characteristic representing either a sharp or gradual change of the dye spectrum in the wavelength direction, the dye-amount/variation-amount estimating portion estimating, based on the dye spectrum stored in the dye spectrum storage portion and the variation characteristic calculated by the variation characteristic calculating portion, a dye-amount and a variation amount based on the variation characteristic from a pixel value of each pixel forming the stained sample image, the arithmetic portion analyzing the stained sample image at least based on the variation amount, the virtual microscope system being configured to acquire a virtual slide image of the stained sample, based on the stained sample analyzed by the arithmetic portion.

* * * * *